US006398883B1

(12) United States Patent
Forrest et al.

(10) Patent No.: US 6,398,883 B1
(45) Date of Patent: Jun. 4, 2002

(54) FRICTION STIR GRAIN REFINEMENT OF STRUCTURAL MEMBERS

(75) Inventors: R. Scott Forrest, Santa Ana; Douglas J. Waldron, Fountain Valley, both of CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/589,504

(22) Filed: Jun. 7, 2000

(51) Int. Cl.$^7$ ............................................. B23K 20/12
(52) U.S. Cl. ....................... 148/516; 148/527; 148/902; 148/907; 228/112.1
(58) Field of Search ................................ 148/516, 527, 148/902, 907; 228/112.1

(56) References Cited

U.S. PATENT DOCUMENTS

| | | | |
|---|---|---|---|
| 4,728,374 A | | 3/1988 | Larson et al. |
| 4,874,437 A | | 10/1989 | Masuda et al. |
| 4,930,675 A | | 6/1990 | Bedford et al. |
| 5,145,530 A | | 9/1992 | Cassady |
| 5,167,728 A | | 12/1992 | Weber |
| 5,460,317 A | | 10/1995 | Thomas et al. |
| 5,611,479 A | | 3/1997 | Rosen |
| 6,168,067 B1 | * | 1/2001 | Waldron et al. ......... 228/112.1 |
| 6,230,957 B1 | * | 5/2001 | Arbegast et al. ......... 228/112.1 |

* cited by examiner

Primary Examiner—George Wyszomierski
(74) Attorney, Agent, or Firm—Alston & Bird LLP

(57) ABSTRACT

The present invention provides an improved structural assembly constructed of a plurality of structural members secured together. At least one of the plurality of structural members defines a first region characterized by comparatively high operational stress and a second region having a locally refined grain structure positioned such that the second region at least partially encompasses the first region to thereby enhance the strength, toughness and fatigue resistance of the at least one structural member in the first region. The present invention also provides a method for selectively improving the strength, toughness and fatigue resistance of a structural member in a region of high operational stress including the steps of casting the structural member in a pre-selected configuration. Regions of the structural member having comparatively high operational stress are identified. The structural member is secured to prevent movement. The region of the structural member having comparatively high operational stress is then mixed with a rotating friction stir welding probe to locally refine the grain structure of the structural member within the region of high operational stress to thereby improve the strength, toughness and fatigue resistance of the structural member in the region. The structural member can be secured to other structural members to form the frame of an aircraft. The improved structural assembly will have an increased operational life, as well as require less stock material with a corresponding decrease in the overall weight of the assembly.

14 Claims, 10 Drawing Sheets

(1 of 10 Drawing Sheet(s) Filed in Color)

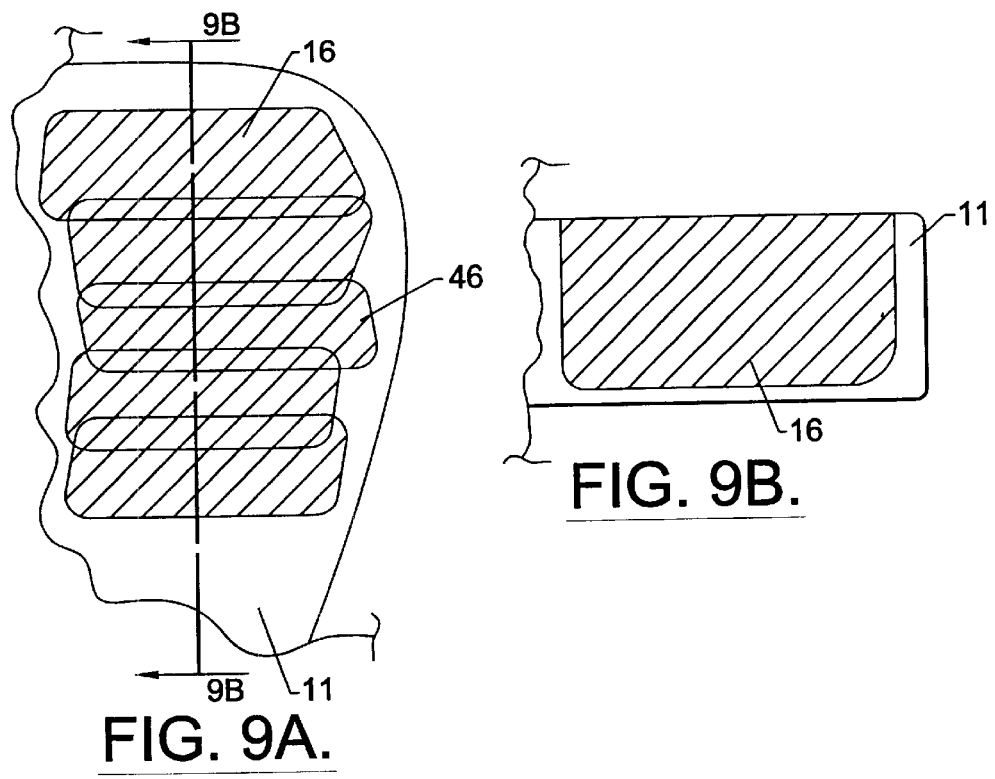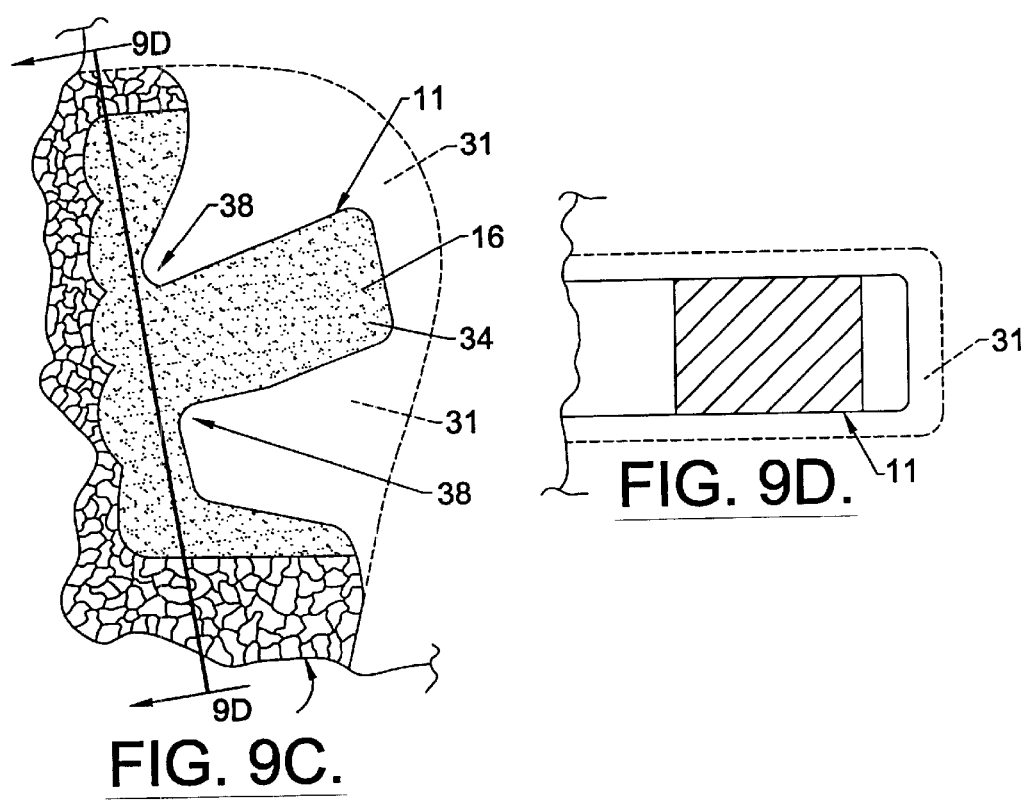

FRICTION STIR GRAIN REFINEMENT OF STRUCTURAL MEMBERS

FIELD OF THE INVENTION

The present invention relates to selectively improving the material properties of structural members and, more particularly, relates to selectively refining the grain structure of structural members.

BACKGROUND OF THE INVENTION

Conventional structural assemblies, such as those used in the manufacture of military and commercial aircraft, are commonly fabricated from a plurality of structural members secured together to form a built-up structure. The structural members are typically forged, machined from stock material or cast in various configurations from steel, stainless steel, magnesium, magnesium alloys, copper, copper alloys, brass, aluminum, aluminum alloys, or titanium.

During use, aircraft structural assemblies are subjected to static and cyclic loads, as well as a variety of environmental conditions, temperature variations, and severe acoustic and vibration environments, all of which create mechanical and thermal stresses. While these operational stresses generally exist throughout the individual structural members forming the structural assembly, certain regions of each structural member are typically subjected to comparatively higher magnitudes of stress. For example, under cyclic loading conditions, threaded openings machined into a structural member to facilitate attachment to other structural members when forming a structural assembly can significantly increase the stress in the immediate vicinity of the opening. High operational stresses can lead to micro-cracking or fracture of the structural members of a structural assembly, which can result in the eventual failure of the assembly. In addition, due to the large number of parts and fasteners utilized in the construction of conventional structural assemblies, maintenance, repair and replacement of structural members, if necessary, can be time consuming and labor intensive, which can be costly over the life of the assembly.

In seeking to enhance the strength, toughness and fatigue resistance of structural members and, thus, increase the useful life of structural assemblies, designers have modified the dimensions of the structural members in the regions of high operational stress, for example, by increasing the thickness of the members in these regions. Designers have also experimented with substituting more exotic and, typically, more expensive types of materials for use in the fabrication of the structural members. Structural members can also undergo precipitation hardening whereby the members are solution heat treated and then aged at predetermined temperature schedules to thereby improve the grain structure and, thus, the material properties of the members. However, the precipitation hardening process can be time and labor intensive and provides only limited improvement of material properties, and even selective increases in the thickness of a structural member can negatively increase the overall weight of the structural assembly, as well as resulting in increased material cost.

Accordingly, there remains a need for improved structural members and methods of manufacture that will increase the operational life of structural assemblies. The improved structural members must have enhanced strength, toughness and fatigue resistance, especially in those regions subjected to high operational stresses.

SUMMARY OF THE INVENTION

The present invention provides a structural member defining a first region characterized by comparatively high operational stress and a second region having a more refined grain structure than other portions of the structural member positioned such that the second region at least partially encompasses the first region to thereby selectively improve the strength, toughness and fatigue resistance of the structural member in the first region. The structural member may be formed from steel, stainless steel, magnesium, magnesium-based alloys, brass, copper, beryllium, beryllium-copper alloys, aluminum, aluminum-based alloys, aluminum-zinc alloys, aluminum-copper alloys, aluminum-lithium alloys, or titanium.

The second region can be defined based upon the particular region that will be subjected to comparatively high operational stress. For example, the structural member may define a threaded opening at least partially contained within the second region. Alternatively, the structural member can have an I-shaped configuration having opposed end portions and a web interconnecting the end portions, wherein the second region encompasses at least a portion of the web of the I-shaped member. In another embodiment, the structural member has an I-shaped configuration wherein said second region includes at least a portion of at least one of said opposed end portions. In yet another embodiment, the structural member has a tubular configuration. In still another embodiment, the structural member defines a plurality of regions having refined grain structures, wherein the regions are spaced apart and generally parallel. In still another embodiment, the structural member defines a first set of regions having refined grain structures and a second set of regions having refined grain structures. The first set of regions are spaced apart and generally parallel. The second set of regions are spaced apart and generally parallel and wherein the first set of regions intersects the second set of regions to thereby define a plurality of containment zones.

The present invention provides a structural assembly including a plurality of structural members. The plurality of structural members are secured together to form the structural assembly. The structural members may be formed from steel, stainless steel, magnesium, magnesium-based alloys, brass, copper, beryllium, beryllium-copper alloys, aluminum, aluminum-based alloys, aluminum-zinc alloys, aluminum-copper alloys, aluminum-lithium alloys, or titanium. At least one of the plurality of structural members defines a first region characterized by comparatively high operational stress and a second region having a more refined grain structure than other portions of the structural member positioned such that the second region at least partially encompasses the first region to thereby selectively improve the strength, toughness and fatigue resistance of the at least one structural member in the first region.

The second region can be defined based upon the particular region that will be subjected to comparatively high operational stress. For example, the at least one structural member may define a threaded opening at least partially contained within the second region. Alternatively, the at least one structural member can have an I-shaped configuration having opposed end portions and a web interconnecting the end portions, wherein the second region encompasses at least a portion of the web of the I-shaped member. In another embodiment, the structural assembly has an I-shaped configuration wherein said second region includes at least a portion of at least one of said opposed end portions. In yet another embodiment, the at least one structural member has a tubular configuration. In still another embodiment, the at least one structural member defines a plurality of regions having refined grain structures, wherein the regions are spaced apart and generally parallel. In still another embodiment, the at least one structural member defines a first set of regions having refined grain structures and a second set of regions having refined grain structures. The first set of regions are spaced apart and generally parallel. The second set of regions are spaced apart and generally parallel and wherein the first set of regions intersects the second set of regions to thereby define a plurality of containment zones.

The present invention also provides a method for selectively improving the strength, toughness and fatigue resistance of a structural member in a region of high operational stress. According to one embodiment, the method includes casting the structural member in a pre-selected configuration. Alternatively, the structural member can be forged or fabricated as a wrought or machined part. Regions of the structural member having a comparatively high operational stress are identified. The structural member is secured to prevent movement. A region of the structural member having comparatively high operational stress is then mixed with a rotating friction stir welding probe to locally refine the grain structure of the structural member within the region of high operational stress to thereby improve the strength, toughness and fatigue resistance of the structural member within the region. The mixing step can include positioning a friction stir welding probe adjacent the region of the structural member having comparatively high operational stress. A rotating friction stir welding probe can then be inserted through the outer surface of the structural member proximate to the region of high operational stress to locally refine the grain structure of the high-stress region. The rotating friction stir welding probe can be moved through the structural member along a path corresponding to the region of high operational stress. The friction stir welding probe can be withdrawn from the outer surface of the structural member to thereby define a threaded opening at least partially within the region of the structural member having a locally refined grain structure. If desired, the structural member can be precipitation hardened prior to or after the inserting step.

After mixing the region of the structural member having the comparatively high operational stress, the structural member can be machined to a corresponding pre-selected shape and thickness. A threaded opening can be machined at least partially within the portion of the structural member having a locally refined grain structure. The structural member can then be secured to other structural members to form the frame of an aircraft.

Accordingly, the present invention provides an improved structural assembly and associated method of manufacture in which the assembly is constructed from structural members having enhanced strength, toughness and fatigue resistance in those regions subjected to comparatively high operational stresses. The improved structural assembly will have an increased operational life, as well as require less stock material with a corresponding decrease in the overall weight of the assembly.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, and wherein:

FIG. 9A is a plan view illustrating one embodiment of a structural member according to the present invention having a continuous area of locally refined grain structure defined by a plurality of overlapping elongate regions of locally refined grain structure;

FIG. 9B is a cross-sectional view along lines 9B—9B of FIG. 9A of the structural member of FIG. 9A;

FIG. 9C is a plan view illustrating the finish machined profile of the structural member of FIG. 9A;

FIG. 9D is a cross-sectional view along lines 9D—9D of FIG. 9C of the structural member of FIG. 9C;

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
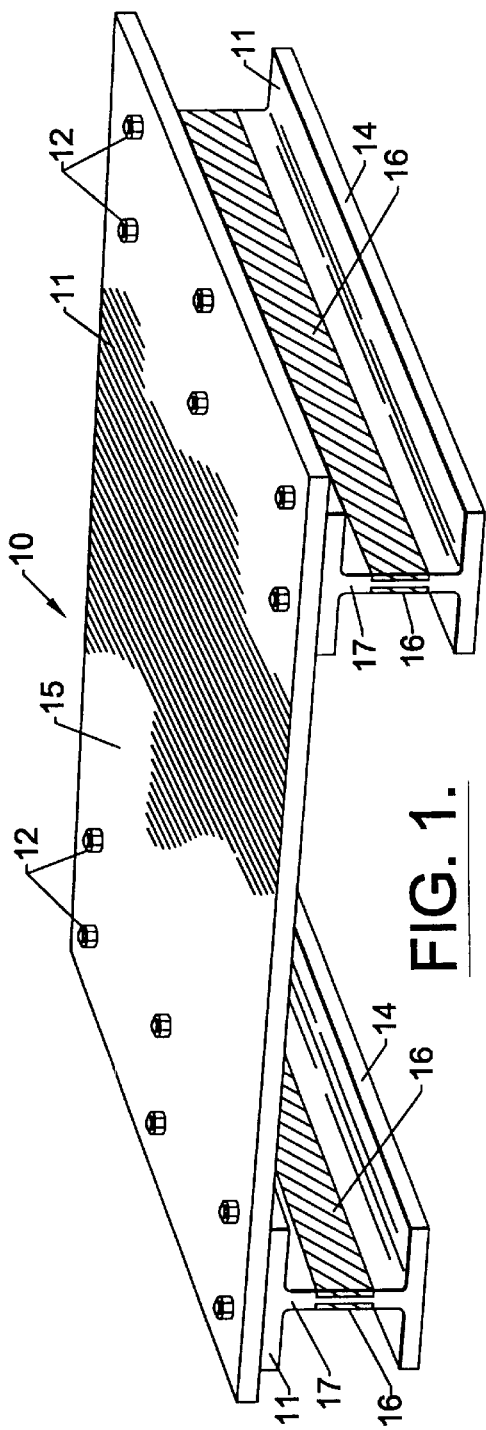
FIG. 1 is a perspective view illustrating a structural assembly, according to one embodiment of the present invention.
Figure 2A:
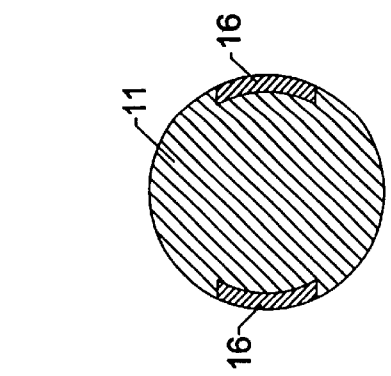
FIGS. 2A, 2B, 2C, and 2D are cross-sectional views illustrating other exemplary embodiments of structural members according to the present invention.
Figure 2B:
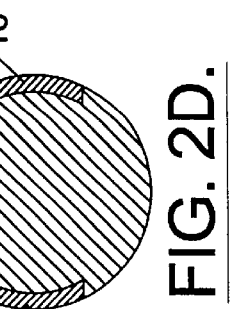
Figure 2C:
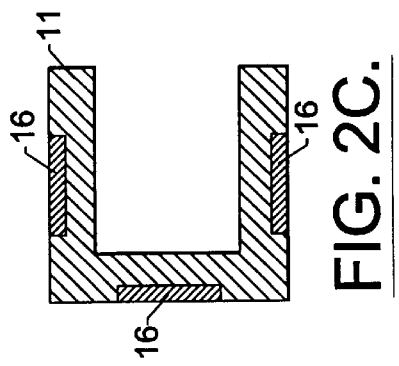
Figure 2D:
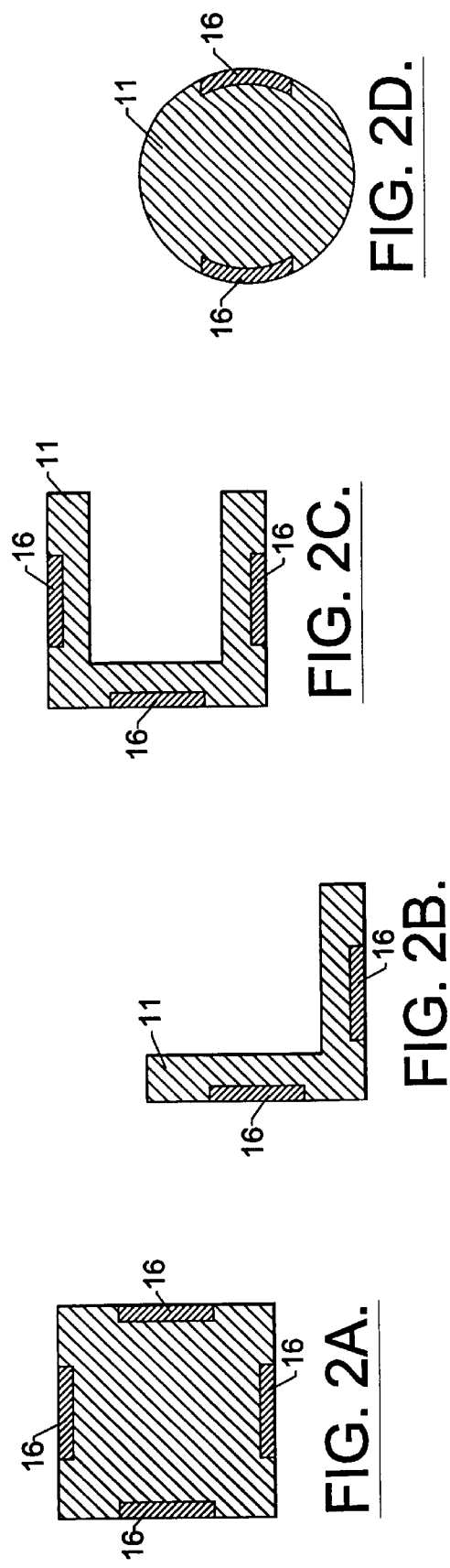

Referring to the drawings and, in particular, to FIG. 1, there is illustrated a structural assembly 10 according to the present invention. The structural assembly 10 can be used in the construction of a variety of structures, including the frame of an aircraft. The structural assembly 10 is constructed of a plurality of structural members 11 that are welded together or secured using suitable fasteners 12. The structural assembly 10 illustrated in FIG. 1 includes two I-beams 14 and one planar member 15. However, other types of structural assemblies can be constructed, if so desired. Although a variety of materials can be utilized, the structural members 11 are preferably formed from steel, stainless steel, magnesium, magnesium-based alloys generally, brass, copper, beryllium, beryllium-copper alloys, aluminum, aluminum-based alloys generally, aluminum-zinc alloys, aluminum-copper alloys, aluminum-lithium alloys, or titanium. The structural members 11 can be machined from stock material or cast. As illustrated in FIG. 2A–2D, the structural members 11 can be cast or machined in a variety of configurations, as is known in the art, based upon the load requirements and other design parameters of the structural assembly 10.

Figure 4A:
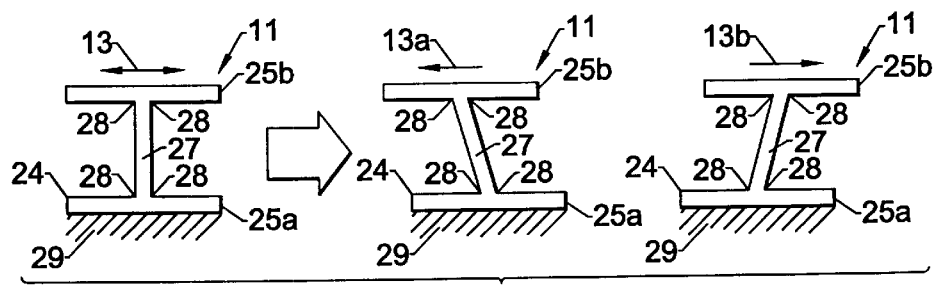
FIGS. 4A–4B are cross-sectional views illustrating conventional I-beams being subjected to an alternating load, as is known in the art.
Figure 4B:
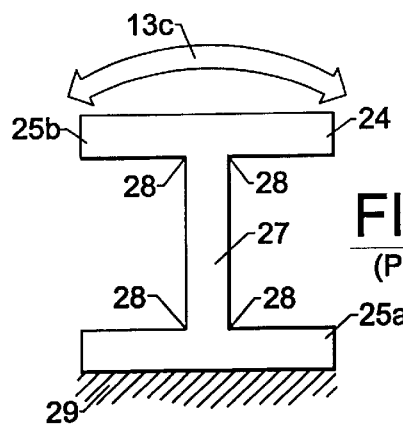

As discussed above, during use, structural assemblies 10 are subjected to static and cyclic loads, as well as a variety of environmental conditions, temperature variations, and severe acoustic and vibration environments, all of which create mechanical and thermal stresses, which are collectively referred to herein as "operational stresses". While the entire structural member 11 is generally subjected to varying magnitudes of operational stress, certain regions of each structural member are typically subjected to comparatively higher magnitudes of operational stress. For example, referring to FIGS. 4A and 4B, there is illustrated an I-beam 24 having opposed end portions 25a, b and a web 27 interconnecting the end portions. One of the end portions 25a of the I-beam 24 is secured to a fixed support structure 29 while the other end portion 25b is subjected to cyclic loading, such as an alternating load 13 in directions 13a, b perpendicular to the plane of the web 27, as illustrated in FIG. 4A, or an alternating bending load 13c, as illustrated in FIG. 4B. The cyclic loading creates moment loads where the web 27 interconnects with the end portions 25a, b. The moment loads result in bending and shear forces, which, when combined with the notch effect of the sharp machined radii 28 at the interconnection of the web and the end portions, generally results in segments of the end portions 25a, b and the web 27 adjacent where the web interconnects with the end portions being subjected to comparatively higher magnitudes of operational stress. In another embodiment (not shown), the loads applied to an I-beam can be such that regions of comparatively high operational stress are located along the length of the web 27. Regions of comparatively high operational stresses can be identified from known mathematical equations and computational techniques, such as finite element analysis.

As illustrated in FIG. 1, at least one structural member 11 of the structural assembly 10 defines one or more regions 16 having a locally refined grain structure, which regions 16 at least partially encompass a region of comparatively high operational stress. Preferably, the grain size within the locally refined regions 16 ranges in order of magnitude from approximately 0.0001 to 0.0002 inches (approximately 3 to 5 microns) and the grains have an equiaxed shape throughout the locally refined region. In contrast, while the grain structure of structural members 11 formed by casting varies in size, shape and orientation depending upon the composition of the cast alloy and the method of cooling the structural member after being cast, typically, the grain size of cast structural members ranges in order of magnitude from approximately 0.1 to 0.01 inches (approximately 2.5 to 0.25 mm). Since the edges of a cast structural member cool more quickly than the interior portions of the member, the grains of a cast structural member usually have a columnar shape at the edges of the member, transitioning to a cubic shape towards the interior of the member.

Figure 6:
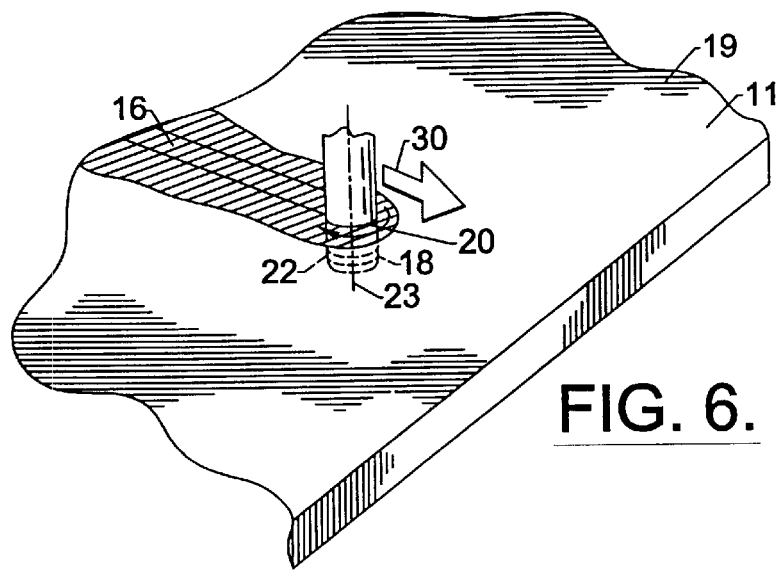
FIG. 6 is a perspective view illustrating selective grain structure refinement of a structural member, according to one embodiment of the present invention.

As illustrated in FIG. 6, the regions 16 of locally refined grain structure are formed by mixing or stirring a portion of the structural member 11 with a non-consumable rotating friction stir welding probe 18. To effect mixing, the structural member 11 is first secured to a worktable of a friction stir welding machine by means of a conventional clamp (not shown). The rotating friction stir welding probe 18 is then inserted through the outer surface 19 of the structural member 11 to a pre-selected depth. An opening can be predrilled or tapped through the outer surface of the structural member 11 to receive the rotating probe, but preferably the rotating probe is thrust directly into and through the outer surface 19 of the structural member 11. Once inserted into the structural member, the rotating probe 18 imparts mixing under the shoulder 20 of the probe by shearing action parallel to the outer surface 19 of the structural member. The rotating probe 18 also imparts mixing around the threaded portion 22 of the probe parallel to the probe axis 23. See U.S. Pat. No. 5,460,317 to Thomas et al. for a general discussion of friction stir welding, the entire contents of which are incorporated herein by reference.

The depth the rotating probe 18 is inserted into the structural member 11 depends upon the material properties and dimensions of the structural member, as well as the types of loads that will be supported by, and the magnitude of operational stress that will be applied to, the structural member. Cyclic or alternating loads can result in microcracks initiating on the surface of a structural member in the regions of comparatively high operational stress, which cracks can eventually result in fatigue failure of the structural member. In one embodiment, only a portion of the thickness of the structural member 11, such as the webs 17 of the I-beams 14 illustrated in FIG. 1 and the surfaces of the structural members 11 illustrated in FIGS. 2A–2D, is selectively mixed to form regions 16 of locally refined grain structure (referred to herein as "partial-penetration mixing"). For example, to partial-penetration mix a structural member having a thickness of 1 inch, the rotating probe can be inserted through the outer surface 19 of the structural member to a depth of approximately 0.25 inches. Advantageously, the regions 16 of locally refined grain structure resist the formation and propagation of microcracks thereby selectively improving the strength, toughness and fatigue resistance of the structural member 11 in the corresponding regions of comparatively high operational stress.

Figure 5A:
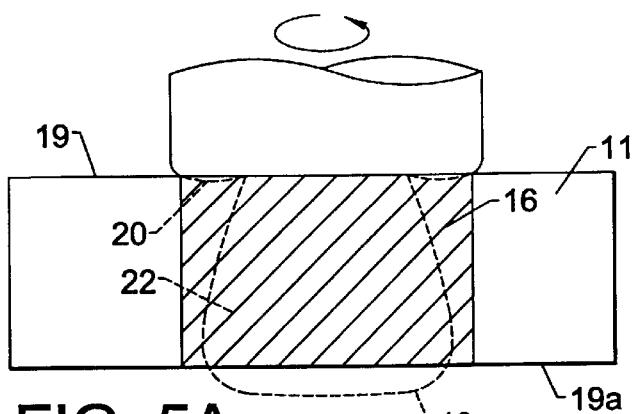
FIG. 5A is a cross-sectional view illustrating selective grain structure refinement of a structural member by mixing the entire thickness of the member, according to one embodiment of the present invention.
Figure 5B:
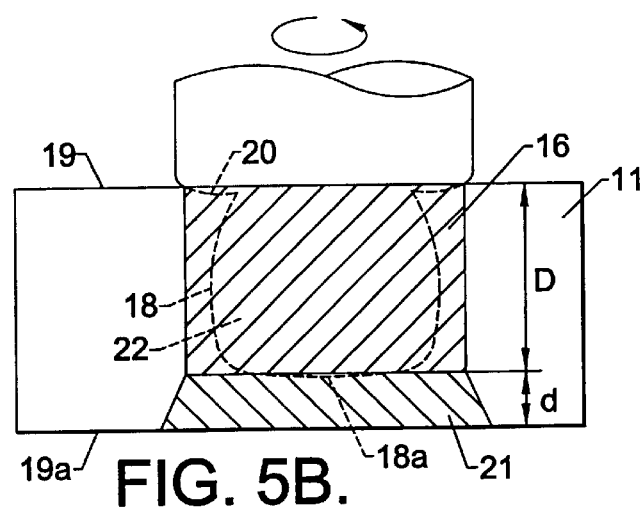
FIG. 5B is a cross-sectional view illustrating selective grain structure refinement of a structural member by mixing a portion of the thickness of the member, according to another embodiment of the present invention.

In another embodiment, as illustrated in FIG. 5B, the probe is thrust to a depth D where the tip 18a of the rotating probe is a distance d from the opposite side 19a of the structural member 11. During mixing, the rotating probe 18 exerts approximately 1000 to 10,000 pound-force or more on the structural member 11, depending on the size of the probe and the depth of probe penetration, and generates sufficient frictional heat to raise the temperature of the portions of the structural member adjacent the rotating probe to between approximately 700° F. and a temperature just below the solidus of the alloy forming the structural member. The frictional heat generated by the rotating probe 18 in combination with the force exerted by the probe on the structural member can result in a forging-like effect on the unmixed portion 21 of the structural member between the probe tip 18a and the opposite side 19a of the structural member that locally refines the grain structure of the unmixed portion without the probe breaching the opposite side 19a. Preferably, to refine the grain structure of the unmixed portion 21 of the structural member 11 between the probe tip 18a and the opposite side 19a of the structural member, the probe 18 is thrust into the structural member to a depth D such that the probe tip is a distance d of approximately 0.007 inches from the opposite side of the structural member.

Figure 5C:
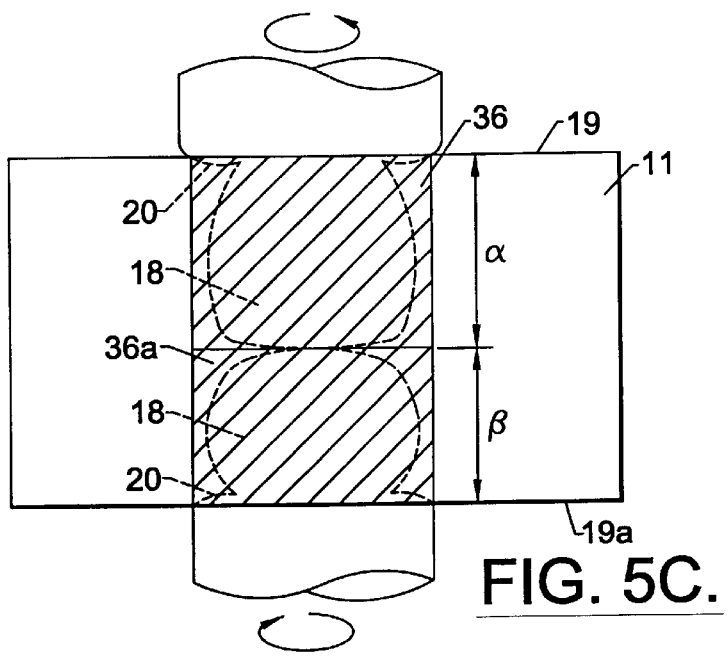
FIG. 5C is a cross-sectional view illustrating selective grain structure refinement of a structural member by mixing the entire thickness of the member, according to still another embodiment of the present invention.

According to another embodiment of the present invention, as illustrated in FIGS. 5A and 5C, the entire thickness of the structural member 11 can be mixed to define a region 16 of locally refined grain structure (referred to herein as "fill-penetration mixing"). Full-penetration mixing is preferred for relatively thin structural members, such as structural members with thickness less than approximately 0.25 inches, but can also be employed to form regions 16 of locally refined grain structure in structural members with thickness greater than 0.25 inches. As illustrated in FIG. 5A, to full-penetration mix a structural member 11 with thickness less than approximately 1.5 inches, the rotating probe 18 can be inserted into the outer surface 19 of the structural member and thrust through the entire thickness of the structural member such that the probe breaches the opposite side 19a of the structural member. After forming the region 16 of locally refined grain structure in the structural member, both sides 19, 19a of the structural member can be machined to provide a finished surface.

When forming elongate regions 16 of locally refined grain structure, as discussed below, the rate of travel of the probe 18 through the structural member is dependent, in part, upon the thickness of the structural member 11. Typically, the rate of travel of the rotating probe through the structural member is proportional to the thickness of the member and ranges from approximately 5 to 30 inches per minute. For structural members with thickness greater than approximately 1.5 inches and, particularly, for structural members with thickness greater than approximately 3 inches full-penetration mixing of the structural member is preferably effected by partial-penetration mixing the structural member from both sides 19, 19a to thereby allow an increased rate of travel of the rotating probe through the structural member and to avoid breaking or damaging the rotating probe. As illustrated in FIG. 5C, a structural member with thickness greater than approximately 1.5 inches can be full-penetration mixed by inserting the rotating probe 18 into and through a first outer side 19 of the structural member 11 to a depth α equal to a pre-selected portion of the thickness of the structural member to form a first region 36 of locally refined grain structure. A rotating probe 18 can then be inserted into and through the opposite side 19a of the structural member 11 opposite to the first locally refined region 36 to a depth β to form a second region 36a of locally refined grain structure. In one embodiment, the depth β is approximately equal to the thickness of the structural member 11 less the insertion depth α of the probe in the first outer side 19 of the structural member. In another embodiment, the depth β is greater than the thickness of the structural member 11 less the insertion depth α of the probe in the first outer side 19 such that the second region 36a of locally refined grain structure at least partially overlaps the first region 36 of locally refined grain structure.

Figure 7A:
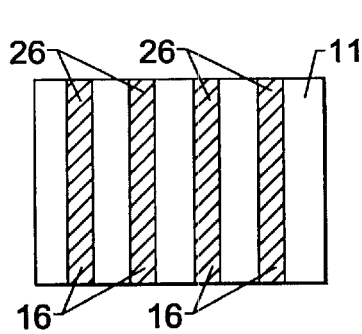
FIG. 7A is a plan view illustrating one embodiment of a structural member according to the present invention having a plurality of reinforcing ribs.

For structural members 11 having elongate regions of comparatively high operational stress, the rotating friction stir welding probe 18 can be moved through the structural member 11 along a path corresponding to the region of high operational stress, as illustrated by the arrow 30 in FIG. 6, to create an elongate region 16 of locally refined grain structure. According to one embodiment, as illustrated in FIG. 7A, for structural members 11 having continuous surface areas that are subjected to comparatively high operational stresses, a plurality of reinforcing "ribs" 26, which are elongate regions 16 of refined grain structure, can be formed in the structural member using a rotating friction stir welding probe 18.

Figure 7B:
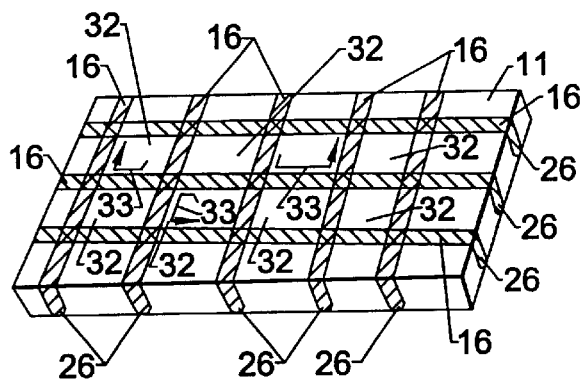
FIG. 7B is a perspective view illustrating another embodiment of a structural member according to the present invention having a plurality of containment zones.
Figure 7C:
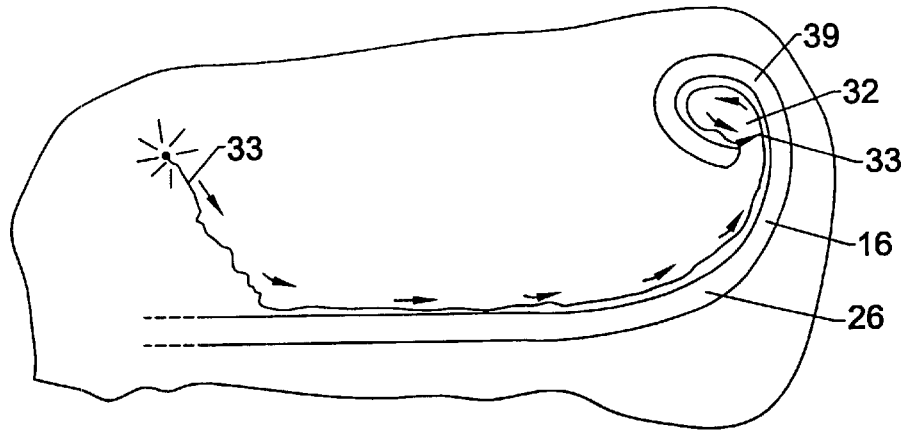
FIG. 7C is a plan view illustrating another embodiment of a structural member according to the present invention having an open curvilinear containment zone.
Figure 8:
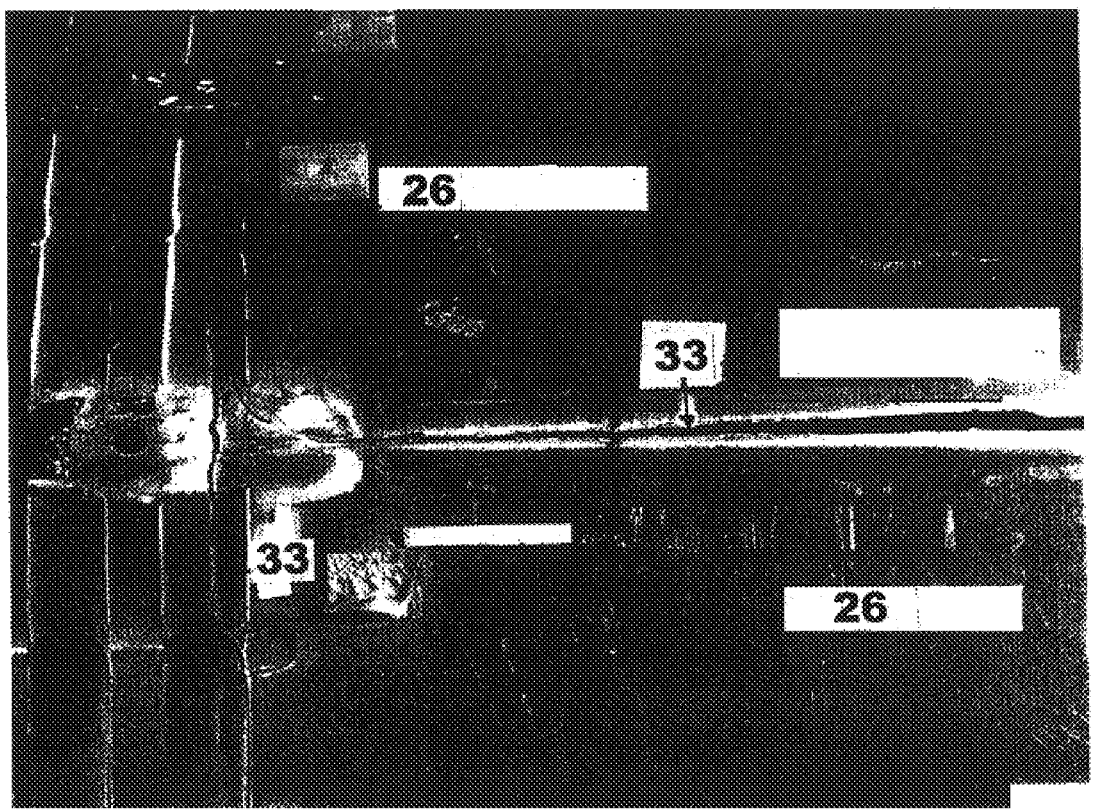
FIG. 8 is a photograph illustrating the propagation of cracks along the periphery of a region of locally refined grain structure, according to one embodiment of the present invention.

As previously discussed and, as illustrated by the photograph of FIG. 8, the regions 16 of locally refined grain structure resist the formation and propagation of microcracks in the surface of the structural member such that the cracks 33 generally do not intersect or traverse the locally refined regions, but rather propagate along the periphery of the regions. In one embodiment, as illustrated in FIG. 7B, reinforcing ribs 26 can be formed about the surface of the structural member 11 so as to intersect other ribs to thereby define bounded regions or containment zones 32. Advantageously, the intersecting ribs 26 restrict the propagation of micro-cracks 33 formed in the surface of the structural member to the area defined by the corresponding containment zone, thus, significantly improving the fatigue resistance of the structural member in the region of comparatively high operational stress. For structural members 11 with thickness of approximately 0.5 inches or less, preferably the reinforcing ribs 26 defining the containment zones 32 are formed by fall-penetration mixing. For relatively thick structural members, the reinforcing ribs 26 defining the containment zones 32 can be formed by partial-penetration mixing. While the containment zones 32 illustrated in FIG. 7B have rectangular configurations and are closed or completely bounded by reinforcing ribs 26, the containment zones according to the present invention can also be at least partially open or unbounded and can have other configurations, including both linear and curvilinear configurations. For example, as illustrated in FIG. 7C, an elongate region 16 of locally refined grain structure can be formed having a curvilinear portion 39, such as a diminishing spiral, that confines and redirects a propagating crack onto itself to blunt the crack and prevent further propagation.

According to another embodiment of the present invention, as illustrated in FIGS. 9A and 9B, for structural members 11 having continuous surface areas that are subjected to comparatively high operational stresses, overlapping regions 16 of locally refined grain structure can be formed to define a continuous area 46 of locally refined grain structure. As illustrated in FIGS. 9C and 9D, the structural member 11 can then be machined to remove any excess material 31 to provide a structural member having the desired dimensions and configuration. Advantageously, where the structural member 11 includes a flange or other protuberance 34 that will be subjected to comparatively high operational stress, such as the one illustrated in FIG. 9C, a continuous area 46 of locally refined grain structure can be machined to provide a protuberance 34 having selectively improved strength, toughness and fatigue resistance.

Figure 10:
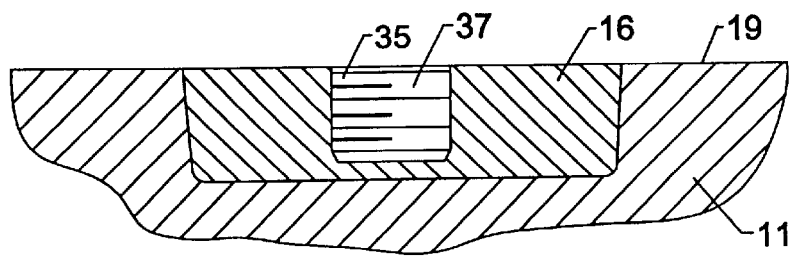
FIG. 10 is a cross-sectional view illustrating one embodiment of a structural member according to the present invention having a threaded opening machined therein.
Figure 11:
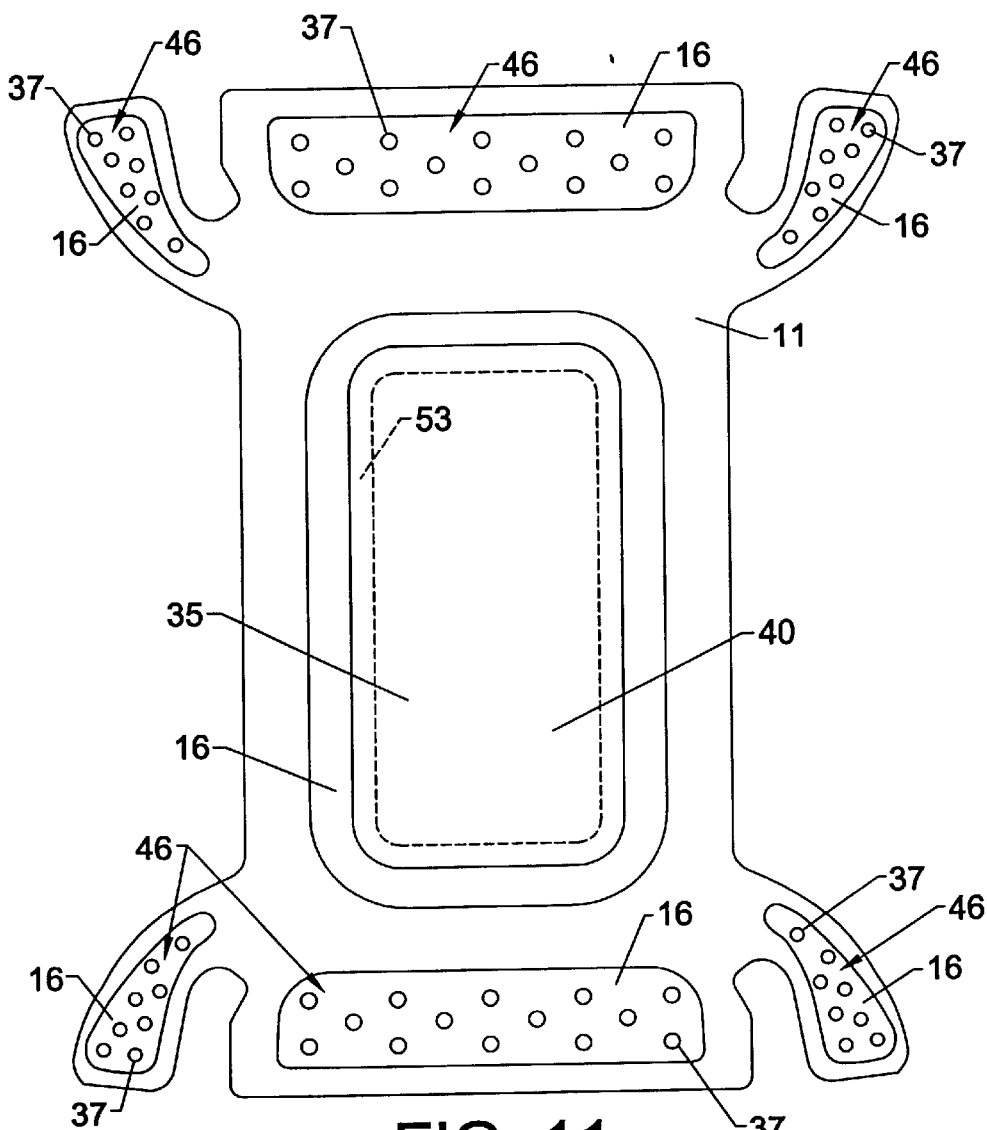
FIG. 11 is a plan view illustrating one embodiment of a structural member according to the present invention having a window.

In another embodiment, the outer surface 19 of the structural member 11 defines a notch, groove, aperture or other surface discontinuity 35, which concentrates stress resulting in comparatively high operational stress proximate to the discontinuity. For example, as illustrated in FIG. 9C, the structural member 11 can include a sharp machined radii 38 where a protuberance 34 interconnects with the member; as illustrated in FIG. 11, the structural member can include a threaded opening 37 to facilitate securing the member to other structural members to form a structural assembly 10; or, as illustrated in FIG. 11, the structural member can include an aperture that defines a window or opening 40 in an aerospace vehicle. Prior to machining or forming a threaded opening 37 or other stress raising discontinuity 35, an area of the structural member 11 that at least partially encompasses the discontinuity can be mixed with a rotating friction stir welding probe 18 to form a region 16 of locally refined grain structure. The threaded opening 37 or other discontinuity 35 can then be machined into the outer surface 19 of the structural member 11 such that the discontinuity 35 is at least partially contained within the region 16 of locally refined grain structure. As illustrated in FIG. 10, the region 16 of locally refined grain structure preferably encompasses and surrounds the threaded opening and extends away from the centerline of the opening a distance ranging from approximately the diameter of the threaded opening to twice the opening diameter. The enhanced material properties of the mixed region 16 will compensate for the increased operational stress in the immediate vicinity of the discontinuity 35.

In one embodiment, a threaded opening 37 is formed by mixing the area of the structural member 11 that encompasses the discontinuity 35 with a rotating friction stir welding probe 18 to form a region 16 of locally refined grain structure. The rotating probe 18, which preferably has threads with dimensions corresponding to the threads of the threaded opening 37, is moved through the structural member 11 to the location on the outer surface 19 of the structural member where the threaded opening is to be formed and is inserted into the member to a depth corresponding to the desired depth of the threaded opening. Once the rotating probe 18 is in the desired location and depth, rotation of the probe is discontinued. The newly formed region 16 of locally refined grain structure is then allowed to cool and, thereafter, the probe 18 is withdrawn from the structural member 11 by unthreading the probe from the structural member to thereby define the threaded opening 37. Advantageously, the threads of the threaded opening 37 are encompassed by the region 16 of locally refined grain structure so that the threads will have enhanced material properties to compensate for increased operational stress.

Figure 3A:
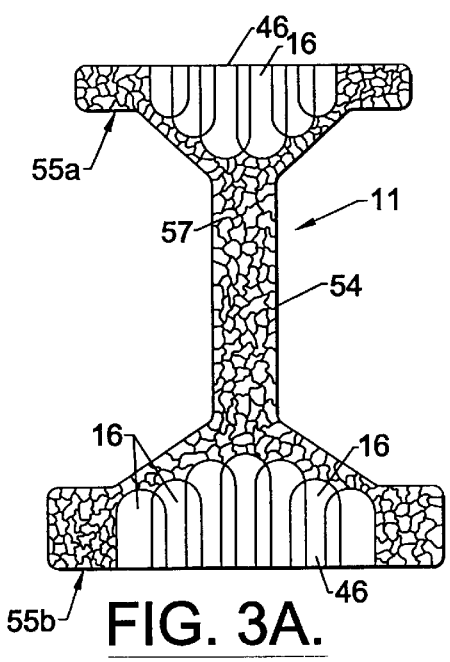
FIG. 3A is a cross-sectional view illustrating a cast I-beam that has been selectively reinforced, according to one embodiment of the present invention.
Figure 3B:
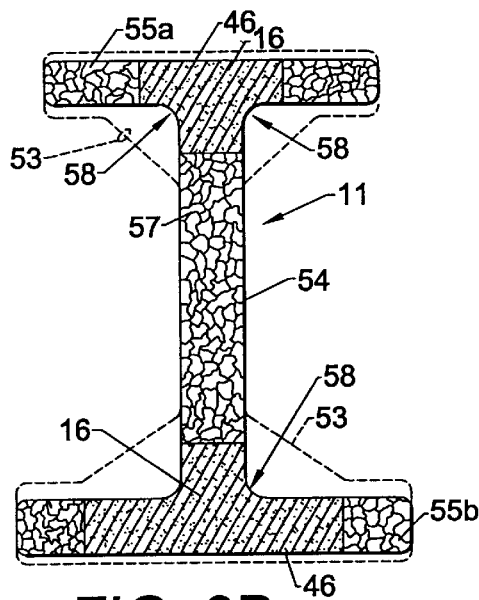
FIG. 3B is a cross-sectional view illustrating the finish machined profile of the I-beam of FIG. 3A.

In another embodiment, as illustrated in FIGS. 3A and 3B, the end portions 55a, b of a cast I-beam 57 can be mixed with a rotating friction stir welding probe 18 prior to final machining to form elongate regions 16 of locally refined grain structure to compensate for the increased operational stress in the immediate vicinity of the sharp machined radii 58 adjacent where the web interconnects with the end portions. The elongate regions 16 of locally refined grain structure preferably overlap to define a continuous area 46 of locally refined grain structure that extends through the end portions 55a, b of the I-beam and at least partially into the corresponding ends of the web 54. After forming the elongate regions 16 of locally refined grain structure, the I-beam 57 can be machined to remove excess material 53 to provide a structural member 11 having the desired dimensions and configuration.

In another embodiment, as illustrated in FIGS. 11, a window or opening 40 in a structural assembly (not shown), such as an aerospace vehicle, is formed by casting a structural member 11 in a pre-selected configuration having the desired opening, as is known in the art. Prior to final machining, the structural member 11 is mixed with a rotating friction stir welding probe 18 about at least a portion of the circumference of the window 40 to form a region or regions 16 of locally refined grain structure that have enhanced material properties to compensate for increased operational stress in the immediate vicinity of the discontinuity 35. While the locally refined region or regions 16 can be formed by partial-penetration mixing, preferably, the structural member 11 is fall-penetration mixed about the circumference of the window 40 to form a plurality of overlapping elongate regions 16 of locally refined grain structure. Overlapping regions 16 of locally refined grain structure can also be formed on either end of the structural member 11 to define continuous areas 46 of locally refined grain structure that at least partially encompass a plurality of threaded openings 37 for securing the structural member to other structural members to form the structural assembly. After forming the region or regions 16 of locally refined grain structure, the structural member 11 can be machined to remove excess material 53 to provide a structural member having the desired dimensions and configuration.

Figure 12:
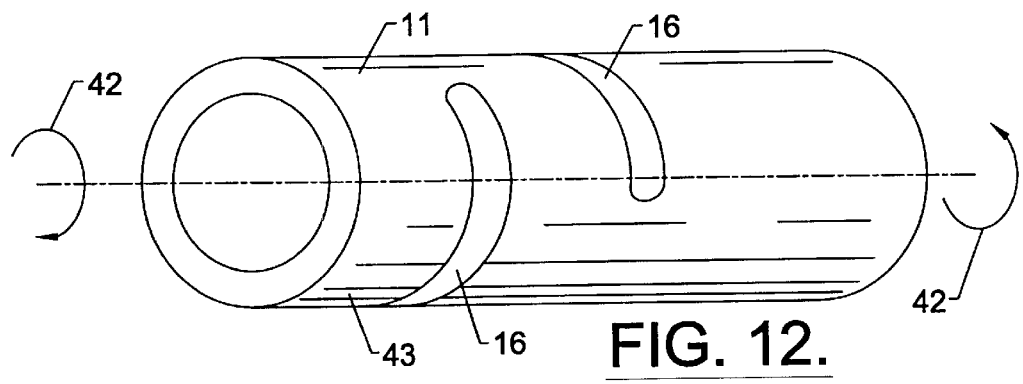
FIG. 12 is a perspective view illustrating one embodiment of a tubular structural member according to the present invention having spirally configured regions of locally refined grain structure.

Referring to FIG. 12, there is illustrated a cast tubular structural member 11, according to one embodiment of the present invention, that will be subjected to a torque load 42. The torque load will result in the structural member 11 being subjected to comparatively higher magnitudes of operational shear stress such that the expected failure mode is a 45° helically shaped shear failure zone. To compensate for increased operational stress, the structural member is preferably mixed with a rotating friction stir welding probe 18 to define one or more elongate regions 16 of locally refined grain structure having a spiral configuration. Advantageously, while the unmixed portions 43 of the cast structural member 11 are relatively brittle, the locally refined regions 16 are relatively ductile and, thus, provide zones for yielding thereby improving the strength, toughness and fatigue resistance of the structural member 11 in the corresponding regions of comparatively high operational stress.

Figure 13A:
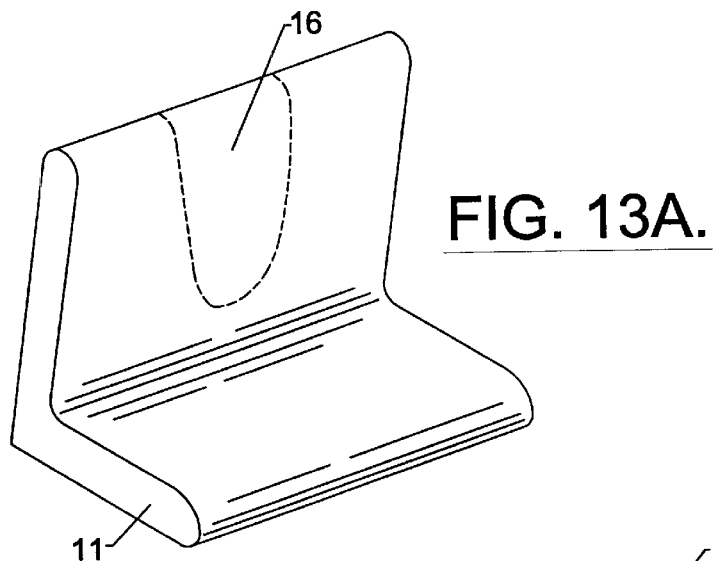
FIG. 13A is a perspective view illustrating one embodiment of a cast structural member according to the present invention prior to being shaped into a finished configuration.
Figure 13B:
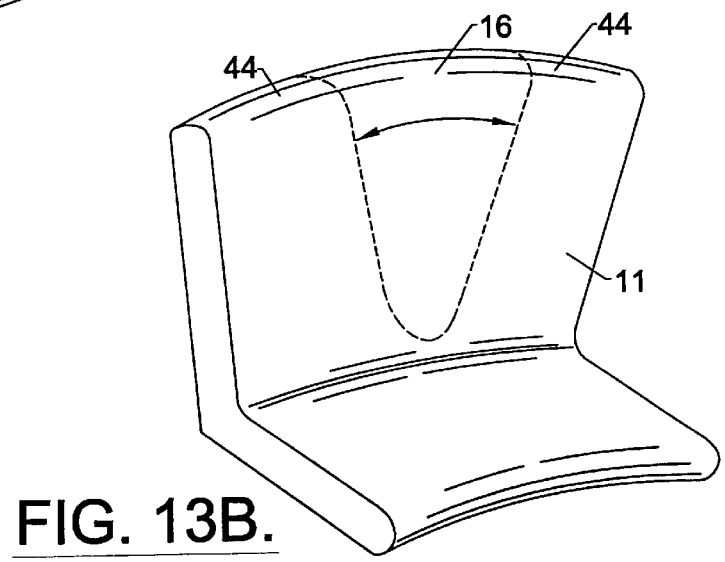
FIG. 13B is a perspective view illustrating the structural member of FIG. 13A after being shaped into its finished configuration.

In another embodiment, as illustrated in FIGS. 13A and 13B, a cast structural member 11 is subjected to machining during fabrication, such as stretching a portion of the structural member to shape the member into a desired configuration. Prior to performing the machining operation, an area of the structural member 11 that at least partially encompasses the area that will be machined can be mixed with a rotating friction stir welding probe 18 to form a region 16 of locally refined grain structure that has improved ductility and formability relative to the unmixed portions of the cast structural member. The structural member can then be machined into the desired configuration, as is known in the art. Advantageously, as illustrated in FIG. 13B, when the machining operation is performed, the stretching will occur in the locally refined region 16 such that any details cast into the unmixed portions 43 of the structural member 11 adjacent the locally refined region will remain dimensionally stable throughout the machining operation.

Figure 14A:
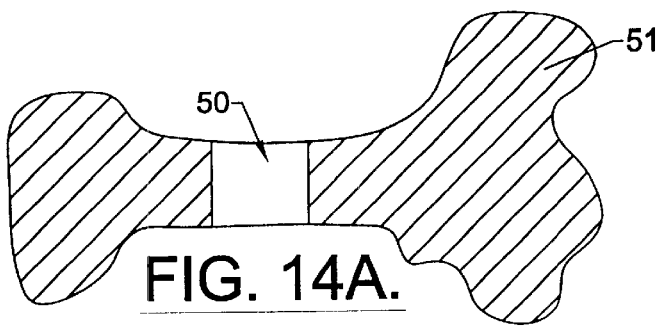
FIG. 14A is a cross-sectional view illustrating a cast structural member having a recess machined therein.
Figure 14B:
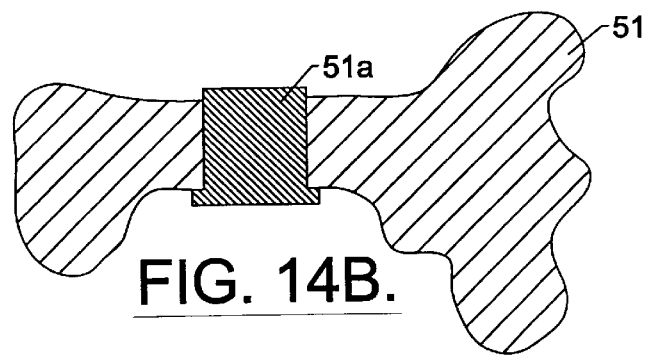
FIG. 14B is a cross-sectional view illustrating the structural member of FIG. 14A having an insert positioned within the aperture.
Figure 14C:
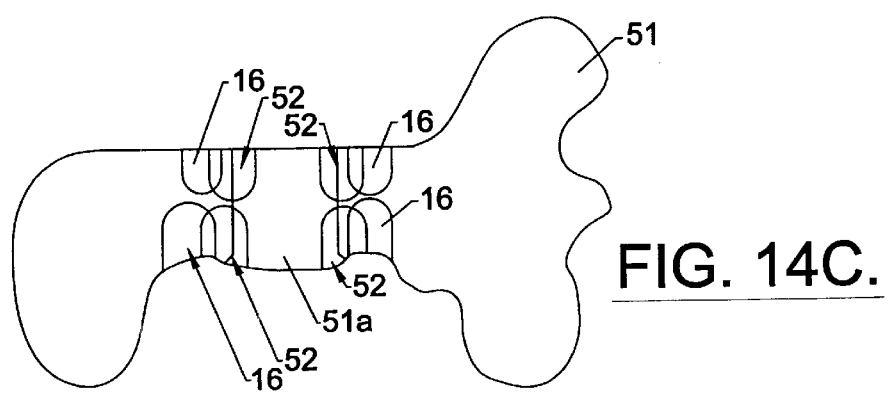
FIG. 14C is a plan view illustrating the insert joined to the structural member of FIG. 14B through a weld joint and a region of locally refined grain structure adjacent to the weld joint, according to one embodiment of the present invention.
Figure 15:
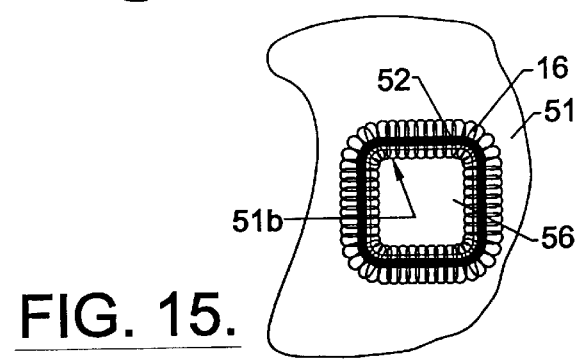
FIG. 15 is a plan view illustrating an insert joined through a weld joint to a structural member and a region of locally refined grain structure adjacent to the weld joint, according to another embodiment of the present invention.

According to another embodiment of the present invention, the structural member can include one or more inserts joined to the member through a weld joint formed by either a fusion or non-fusion welding process. For example, as illustrated in FIGS. 14A–14C, the structural member 51 includes an insert 51a joined to the member through a friction stir weld joint 52. Referring to FIG. 14A, the structural member 51 can include a milled recess or aperture 50 having dimensions corresponding to the dimensions of the insert 51a such that the insert can be slip or press fit to the structural member prior to welding. While the insert 51a can comprise the same material as the structural member 51, preferably, the insert comprises a different material. Similarly, the insert and structural member can be formed from the same or a different fabrication process, such as casting or as a wrought or machined component. In another embodiment, as illustrated in FIG. 15, the insert 51b can comprise a lining for an aperture 56 defined by the structural member 51 and wherein the insert is joined to the structural member by a fusion weld joint 52. The transition in grain size and structure between the insert 51b and the structural member 51 at the weld joint 52, particularly where the insert is formed of a different material or a different fabrication process, creates stress risers resulting in comparatively high operational stress. To compensate for increased operational stress due to grain size discontinuity, the structural member 51 and insert 51b are preferably mixed with a rotating friction stir welding probe 18 adjacent to, and along the path of, the weld joint 52 to define one or more elongate regions 16 of locally refined grain structure.

According to another embodiment (not shown), the structural member defines an external or internal defect that concentrates stress resulting in comparatively high operational stress proximate to the defect. For example, an external defect in a cast structural member may include, gas or blow holes communicating with the surface; inclusions, such as scale or oxides; or hot tears and cracks due to shrinkage after casting. Internal defects in castings may include internal shrinkage. An external defect in a forging may include laps, laminations, slivers, scabs, seams, bark, or cracks. To compensate for increased operational stress and heal the defect, the structural member is preferably mixed with a rotating friction stir welding probe to define one or more regions of locally refined grain structure.

Once a region 16 of locally refined grain structure having a desired shape and length is formed in the structural member 11, the rotating probe 18 is withdrawn from the member. The withdrawal of the rotating probe 18 can result in an irregularity in the outer surface 19 of the structural member 11. In one embodiment (not shown), the portions of the structural member containing any irregularities caused by the withdrawal of the rotating probe 18 can be cutaway or filled. Preferably, the structural member 11 is then machined into a pre-selected shape and thickness, as required by the specific design loads and specifications of the resulting structural assembly 10, or to obtain the desired surface finish. For example, a CNC milling machine can be used to machine the structural member 11 as necessary.

The rotation of the friction stir welding probe 18 within the structural member 11 generates sufficient heat energy to plasticize the surrounding material thereby creating a severely deformed, but highly refined grain structure. In addition, the mixing process eliminates voids, thus, increasing the density of the structural member 11 in the mixed regions 16. Advantageously, the regions 16 of locally refined grain structure have significantly enhanced strength, toughness and fatigue resistance in comparison to the unmixed portions of the structural member 11. Since the regions 16 of locally refined grain structure encompass all or at least a portion of the region that is anticipated to undergo comparatively high operational stress, the regions 16 of locally refined grain structure allow the resulting region to better withstand the high operational stress. Due to the enhanced material properties of the mixed regions 16 of the structural members 11, the thickness of the structural members in those areas having mixed regions may be reduced to thereby obtain a reduction in the overall weight of a structural assembly 10 constructed according to the present invention.

The structural members 11 may also be precipitation hardened to improve the material properties of the unmixed portions of the members. This is particularly advantageous for aluminum alloys. Precipitation hardening of metal alloys is a process whereby the mechanical properties of the metal alloy are improved by the formation of uniformly dispersed particles or precipitates of one or more secondary phases within the original phase matrix. As is known in the art, precipitation hardening requires that the metal alloy undergo two heat treatment processes, the first process being a solution heat treatment and the second process being a precipitation heat treatment, both of which are conducted at predetermined temperature schedules. While precipitation hardening may be conducted either before or after locally refining the grain structure of the structural members 11, preferably, the precipitation hardening process is conducted after forming the regions 16 of locally refined grain structure. When precipitation hardening a structural member after locally refining the grain structure of the member, the regions 16 of locally refined grain structure should be sufficiently heated during mixing so as not to create an excessive amount of residual stress between the locally refined regions and the unmixed portions of the structural member.

Figure 16:
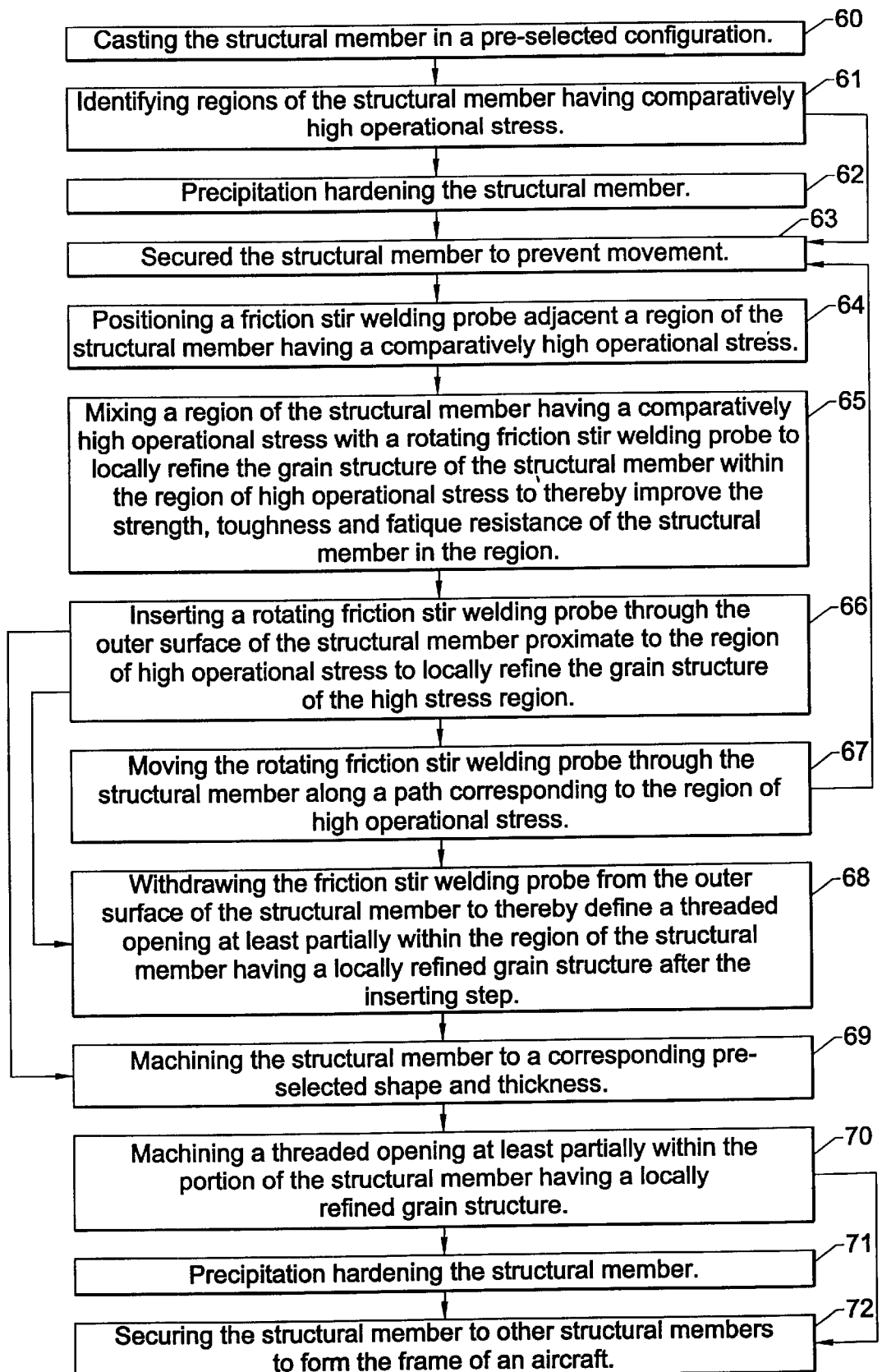
FIG. 16 is a flow chart illustrating the operations performed, according to one embodiment of the present invention, in order to fabricate the structural assembly of FIG. 1 and the structural members of FIGS. 2–15.

Referring now to FIG. 16, there is illustrated the operations performed to manufacture a structural member according to one embodiment of the present invention. The first step includes casting the structural member in a pre-selected configuration. See block 60. Regions of the structural member having comparatively high operational stress are identified, such as by mathematical analysis or based upon prior experience. See block 61. The structural member may be precipitation hardened to initially improve the material properties of the entire member. See block 62.

The structural member is then secured to prevent movement. See block 63. A friction stir welding probe is positioned adjacent a region of the structural member having a comparatively high operational stress. See block 64. A region of the structural member having a comparatively high operational stress is then mixed with a rotating friction stir welding probe to locally refine the grain structure of the structural member within the region of high operational stress to thereby improve the strength, toughness and fatigue resistance of the structural member in the region. See block 65. The mixing step includes inserting a rotating friction stir welding probe through the outer surface of the structural member proximate to the region of high operational stress to locally refine the grain structure of the high stress region. See block 66. The mixing step may also include moving the rotating friction stir welding probe through the structural member along a path corresponding to the region of high operational stress. See block 67. In one preferred embodiment, the securing, positioning and mixing steps are repeated to form more than one region of locally refined grain structure within the structural member. In another preferred embodiment, the positioning and mixing steps are repeated to form the desired number of regions of locally refined grain structure within the structural member, for example, a plurality of reinforcing ribs that are spaced apart and generally parallel. In one embodiment, the friction stir welding probe is withdrawn from the outer surface of the structural member to thereby define a threaded opening at least partially within the region of the structural member having a locally refined grain structure after the inserting step. See block 68.

The structural member is then machined to a corresponding pre-selected shape and thickness. See block 69. A threaded opening can be machined at least partially within the portion of the structural member having a locally refined grain structure. See block 70. The structural member can then be precipitation hardened. See block 71. The structural member is then secured to other structural members to form the frame of an aircraft. See block 72.

Thus, the present invention provides an improved structural assembly and associated method of manufacture in which the assembly is constructed from structural members having enhanced strength, toughness and fatigue resistance in those regions subjected to comparatively high operational stresses. The improved structural assembly will have an increased operational life and reliability, as well as require less stock material with a corresponding decrease in the overall weight of the assembly. In addition, the improved method of manufacture also allows for the employment of more castings, which are typically less expensive to fabricate than an equivalent wrought or machined component, in construction of structural assemblies for the aerospace industry.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for selectively improving the strength, toughness and fatigue resistance of a structural member in a region of high operational stress, the method comprising:

securing the structural member to prevent movement;

identifying a region of the structural member having a comparatively high operational stress;

positioning a friction stir welding probe adjacent the region of high operational stress; and thereafter, inserting a rotating friction stir welding probe through the outer surface of the structural member to locally refine the grain structure of the structural member within the region of high operational stress to thereby improve the strength, toughness and fatigue resistance of the structural member in the region.

2. A method as defined in claim 1, further comprising casting the structural member in a pre-selected configuration prior to said securing step.

3. A method as defined in claim 1 further comprising moving the rotating friction stir welding probe through the structural member along a path corresponding to the region of high operational stress after said inserting step.

4. A method as defined in claim 1, further comprising machining the structural member to a corresponding pre-selected shape and thickness after said inserting step.

5. A method as defined in claim 1, further comprising machining a threaded opening at least partially within the region of the structural member having a locally refined grain structure after said inserting step.

6. A method as defined in claim 1, further comprising withdrawing the friction stir welding probe from the outer surface of the structural member to thereby define a threaded opening at least partially within the region of the structural member having a locally refined grain structure after said inserting step.

7. A method as defined in claim 1, further comprising the step of precipitation hardening the structural member after said inserting step.

8. A method as defined in claim 1, further comprising the step of attaching the structural member to other structural members to form the frame of an aircraft.

9. A method for selectively improving the strength, toughness and fatigue resistance of a structural member in a region of high operational stress, the method comprising:

securing a structural member to prevent movement;

identifying a region of the structural member having a comparatively high operational stress;

thereafter, mixing the region of the structural member having a comparatively high operational stress with a rotating friction stir welding probe to locally refine the grain structure of the structural member within the region of high operational stress to thereby improve the strength, toughness and fatigue resistance of the structural member in the region.

10. A method as defined in claim 9, wherein said mixing step comprises:

inserting a rotating friction stir welding probe through the outer surface of the structural member to locally refine the grain structure of the structural member within the region of high operational stress; and thereafter, moving the rotating friction stir welding probe through the structural member along a path corresponding to the region of high operational stress.

11. A method as defined in claim 9, further comprising machining the structural member to a corresponding preselected shape and thickness after said mixing step.

12. A method as defined in claim 9, further comprising machining a threaded opening at least partially within the region of the structural member having a locally refined grain structure after said mixing step.

13. A method as defined in claim 9, further comprising the step of precipitation hardening the structural member prior to said mixing step.

14. A method as defined in claim 9, further comprising the step of attaching the structural member to other structural members to form the frame of an aircraft.

* * * * *